(12) United States Patent
Chen et al.

(10) Patent No.: US 12,044,917 B2
(45) Date of Patent: Jul. 23, 2024

(54) TILED DISPLAY WITH ACCOMMODATING CAVITY

(71) Applicant: TCL CHINA STAR OPTOELECTRONICS TECHNOLOGY CO., LTD., Guangdong (CN)

(72) Inventors: Yao Chen, Guangdong (CN); Min Wang, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/623,279

(22) PCT Filed: Dec. 16, 2021

(86) PCT No.: PCT/CN2021/138807
§ 371 (c)(1),
(2) Date: Dec. 28, 2021

(87) PCT Pub. No.: WO2023/103006
PCT Pub. Date: Jun. 15, 2023

(65) Prior Publication Data
US 2024/0036378 A1    Feb. 1, 2024

(30) Foreign Application Priority Data

Dec. 9, 2021 (CN) .......................... 202111501308.0

(51) Int. Cl.
*G02F 1/1333* (2006.01)
*F21V 8/00* (2006.01)

(52) U.S. Cl.
CPC ....... *G02F 1/13336* (2013.01); *G02B 6/0068* (2013.01); *G02B 6/0088* (2013.01); *G02F 1/133308* (2013.01)

(58) Field of Classification Search
CPC ........... G02F 1/13336; G02F 1/133308; G02B 6/0068; G02B 6/0088
See application file for complete search history.

(56) References Cited

U.S. PATENT DOCUMENTS

| 5,889,568 A | 3/1999 | Seraphim |
| 2002/0118321 A1 | 8/2002 | Ge |

(Continued)

FOREIGN PATENT DOCUMENTS

| CN | 101211048 A | 7/2008 |
| CN | 102456300 A | 5/2012 |

(Continued)

OTHER PUBLICATIONS

«Acta Optics» vol. 35 Issue 11 full text feng qi bin, etc. Lens Array with Double Freeform Surface for LED Backlight in LCD Imaging Engine of Helmet-Mounted Display.

(Continued)

*Primary Examiner* — Tracie Y Green
(74) *Attorney, Agent, or Firm* — PV IP PC; Wei Te Chung; Zhigang Ma (57) ABSTRACT

The embodiments of the application provide a tiled display, which includes a housing, a backlight unit arranged on a side of the housing, at least two supports provided in the housing and located on a light output side of the backlight unit, and at least two tiling liquid crystal display panels. The liquid crystal display panels are fixed on the housing and located on a side of the support away from the backlight unit. A bezel at the tiling of two adjacent liquid crystal display (Continued)

panels is arranged on the support, and a width of the bezel is greater than or equal to a width of the support.

19 Claims, 7 Drawing Sheets

(56) References Cited

U.S. PATENT DOCUMENTS

| | | |
|---|---|---|
| 2005/0157516 A1 | 7/2005 | Chen |
| 2008/0036940 A1* | 2/2008 | Song .................. G02F 1/133608 362/249.16 |
| 2008/0158468 A1* | 7/2008 | Kim .................... G02F 1/13336 349/58 |
| 2011/0116001 A1 | 5/2011 | Chen |
| 2011/0221995 A1* | 9/2011 | Park .................... G02F 1/13336 349/58 |
| 2012/0268684 A1 | 10/2012 | Li |
| 2013/0128157 A1* | 5/2013 | Kuo ......................... H05K 5/02 313/46 |
| 2015/0277173 A1 | 10/2015 | Jung |
| 2016/0116788 A1 | 4/2016 | Samurada |
| 2016/0161784 A1 | 6/2016 | Du |
| 2018/0052312 A1 | 2/2018 | Jia |
| 2019/0310517 A1* | 10/2019 | Qu ..................... G02F 1/133606 |
| 2020/0258431 A1 | 8/2020 | Cai |
| 2020/0271971 A1 | 8/2020 | Su |
| 2021/0302788 A1 | 9/2021 | Wang |

FOREIGN PATENT DOCUMENTS

| | | |
|---|---|---|
| CN | 102902088 A | 1/2013 |
| CN | 105093628 A | 11/2015 |
| CN | 105158969 A | 12/2015 |
| CN | 105759501 A | 7/2016 |
| CN | 106773088 A | 5/2017 |
| CN | 107357063 A | 11/2017 |
| CN | 108563067 A | 9/2018 |
| CN | 207924304 U | 9/2018 |
| CN | 111369900 A | 7/2020 |
| CN | 111552120 A | 8/2020 |
| CN | 211403022 U | 9/2020 |
| CN | 211826808 U | 10/2020 |
| CN | 112817174 A | 5/2021 |
| JP | H11133881 A | 5/1999 |

OTHER PUBLICATIONS

«SID symposium digest of technical papers» Yung-Hsun Wu Multi-spliced LCDs for Foleable Mobile device-seamless technology and applications Dec. 31, 2020 full text.
Chinese Office Action issued in corresponding Chinese Patent Application No. 202111501308.0 dated Jul. 13, 2022, pp. 1-11.
International Search Report in International application No. PCT/CN2021/138807, mailed on Jul. 28, 2022.
Written Opinion of the International Search Authority in International application No. PCT/CN2021/138807, mailed on Jul. 28, 2022.

* cited by examiner

TILED DISPLAY WITH ACCOMMODATING CAVITY

CROSS-REFERENCE TO RELATED APPLICATIONS

This application is a 371 U.S. National Phase of International Application No. PCT/CN2021/138807, filed Dec. 16, 2021, which claims priority to Chinese Patent Application No. 202111501308.0, filed Dec. 9, 2021. The entire disclosures of the above applications are incorporated herein by reference.

FIELD OF INVENTION

The application relates to fields of the displays, in particular to a tiled display.

BACKGROUND OF INVENTION

With the continuous development of display technologies, displays are used in a wider and wider range of applications, not only for televisions, monitors, industrial displays and medical displays, but also increasingly used in public display occasions. In public display applications, displays are generally required to have a large display area to meet the requirements of people watching from a long distance and displaying larger amounts of information. However, the development status of liquid crystal displays (LCDs) is that the conventional sizes range from 32 inches to 55 inches. Displays in this size range require multi-screen tiling if they are used for public displays.

During the assembly process of the tiled display, the tiling of two adjacent LCD panels needs to be supported by a frame. Because the width of the frame is greater than a width of a bezel of a LCD panel, this often leads to a shadow at the tiling of the tiled display, which greatly affects the user's viewing experience.

Technical Problem

The embodiments of the present application provide a tiled display, which can solve the technical problem of shadow at the tiling of two adjacent liquid crystal display panels in a tiled display.

SUMMARY OF INVENTION

Technical Solutions

The embodiments of the application provide a tiled display, including:
- a housing;
- a backlight unit arranged on a side of the housing;
- at least two supports provided in the housing and located on a light output side of the backlight unit; and
- at least two tiling liquid crystal display panels fixed on the housing and located on a side of the support away from the backlight unit, wherein the liquid crystal display panel has a bezel, the bezel at the tiling of two adjacent liquid crystal display panels is arranged on the support, and a width of the bezel is greater than or equal to a width of the support.

In the tiled display provided by the embodiments of the application, the bezel at the tiling of two adjacent LCD panels is arranged on the support, and a width of the bezel is greater than or equal to a width of the support. The support does not block the incoming light of the LCD panel, which can effectively solve the shadow problem of the tiled display.

Optionally, in some embodiments of the present application, the housing includes a back plate and a frame coupled to a peripheral side of the back plate, the back plate and the frame surround to form an accommodating cavity, wherein the backlight unit is at least partially arranged in the accommodating cavity, the support is fixed to the frame, and the liquid crystal display panel is fixed to the frame.

In the tiled display provided by the embodiments of the application, by configuring the backlight unit at least partially arranged in the accommodating cavity, a volume of the tiled display may be reduced, so as to achieve the light-weight design of the tiled display.

Optionally, in some embodiments of the present application, two ends of the support are fixed to the frame, and the middle of the support is suspended on the light output side of the backlight unit.

In the tiled display provided by the embodiments of the application, The suspending portion of the support does not block the light emitted by the backlight unit, which can improve the utilization of light, so as to increase the display brightness at the tiling and solve the shadow problem at the tiling.

Optionally, in some embodiments of the present application, the frame is provided with fixture ribs corresponding to two ends of the support, and the two ends of the support are fixed to the corresponding fixture ribs.

In the tiled display provided by the embodiments of the application, by fixing both ends of the support to the corresponding fixture ribs, thereby suspending the middle of the support, the suspending portion of the support does not block the light emitted by the backlight unit, which can improve the utilization of light, so as to increase the display brightness at the tiling, and solve the shadow problem at the tiling.

Optionally, in some embodiments of the present application, material of the support is selected from one or more of steel wire, nylon wire, carbon plastic wire, ceramic wire, and polyethylene wire.

In the tiled display provided by the embodiments of the application, The wires have a stronger tensile strength and longer service life, so as to avoid sagging and deformation caused by ageing of the support, thereby stably maintaining the spacing between the liquid crystal display panel and the backlight unit.

Optionally, in some embodiments of the present application, the support includes a first support and a second support intersecting with the first support, and the first support and the second support are an integrated structure.

In the tiled display provided by the embodiments of the application, It can be ensured that surfaces of the first support and the second support can be evenly in contact with the liquid crystal display panel so that surfaces of two adjacent liquid crystal display panels are flush.

Optionally, in some embodiments of the present application, the support includes a first support and a second support intersecting with the first support, and the first support and the second support are stacked at the intersection.

In the tiled display provided by the embodiments of the application, Since the first support and the second support are two independent structures, it is convenient to adjust the tension of the first support or the second support separately and reduce the interaction between the first support and the second support.

Optionally, in some embodiments of the present application, a suspending portion of the back plate corresponding to the support is provided with a reinforcement rib, and a part of the support is arranged on the reinforcement rib.

In the tiled display provided by the embodiments of the application, the reinforcement ribs can play a supporting role, and prevent the support from sagging and deformation, thereby stably maintaining the spacing between the liquid crystal display panel and the backlight unit.

Optionally, in some embodiments of the present application, material of the reinforcement rib is a light transmitting material.

In the tiled display provided by the embodiments of the application, The reinforcement ribs do not block the light, which can improve the utilization of light.

Optionally, in some embodiments of the present application, the reinforcement rib is provided with a limitation groove corresponding to the support, and the support is clamped in the limitation groove.

In the tiled display provided by the embodiments of the application, the limitation groove can limit a position of the support and prevent the support from shifting.

Optionally, in some embodiments of the present application, one or more than one of the support is clamped in the limitation groove.

In the tiled display provided by the embodiments of the application, when one support is provided in each limitation groove, each support can be spaced apart to prevent tangling and knotting between the supports. When at least two supports are provided in each limitation groove, the structure of the reinforcement rib is simple, which effectively simplifies the assembling steps of the tiled display.

Optionally, in some embodiments of the present application, the support is bonded to the liquid crystal display panel by a glue.

In the tiled display provided by the embodiments of the application, by gluing the support to the liquid crystal display panel, the liquid crystal display panel can be prevented from shifting, so that the supports can stably support the liquid crystal display panel.

Optionally, in some embodiments of the present application, the liquid crystal display panel is bonded to the frame by a glue.

In the tiled display provided by the embodiments of the application, by bonding part of the bezel of the liquid crystal display panel to the frame, the operation is simple and easy to achieve, and the liquid crystal display panel can be fixed stably on the frame.

Optionally, in some embodiments of the present application, the backlight unit further includes a circuit board, a plurality of light sources arranged on the circuit board, a light guide plate arranged on a light output side of the light sources, and an optical film group arranged on a light output side of the light guide plate.

In the tiled display provided by the embodiments of the application, the light emitted by the light source is injected through the light guide plate and the optical film group, which can achieve uniform light output.

Optionally, in some embodiments of the present application, the circuit board is arranged in the accommodating cavity and fixed on a surface of the back plate.

In the tiled display provided by the embodiments of the application, the circuit board can be protected by accommodating the circuit board in the accommodating cavity, and it also facilitates the lightweight design of the tiled display.

Optionally, in some embodiments of the present application, the frame is provided with a step, the light guide plate is abutted on the step, and the optical film group is stacked on the light guide plate.

In the tiled display provided by the embodiments of the application, A distance between the light guide plate and the light source can be stably maintained to prevent the light source from crushing the light guide plate.

Optionally, in some embodiments of the present application, the circuit board is provided with a spacer, and one end of the spacer away from the circuit board is abutted on the light guide plate.

In the tiled display provided by the embodiments of the application, one end of the spacer away from the circuit board is abutted on the light guide plate, thereby maintaining a stable distance between the light guide 0 and the light source.

Optionally, in some embodiments of the present application, the optical film group includes multilayer laminated optical films, an uppermost layer of the multilayer laminated optical films is provided with a plurality of positioning portions, the frame is provided with a plurality of matching portions corresponding to the positioning portions, and the positioning portions are inserted with the matching portions.

In the tiled display provided by the embodiments of the application, the positioning portions are inserted with the matching portions, so that the optical films are not easy to shift, and the optical films are stably fixed to the frame.

Optionally, in some embodiments of the present application, the positioning portion is provided with a slot, the matching portion is provided with a connecting column, and the connecting column is inserted into the slot.

In the tiled display provided by the embodiments of the application, the optical films are not easy to shift, and the optical films are stably fixed to the frame.

Optionally, in some embodiments of the present application, the positioning portion is provided with a connecting column, the matching portion is provided with a slot, and the connecting column is inserted into the slot.

In the tiled display provided by the embodiments of the application, the optical films are not easy to shift, and the optical films are stably fixed to the frame.

Beneficial Effect

The embodiments of the present application adopt a tiled display, which configures a support at the tiling of two adjacent liquid crystal display panels. The bezel at the tiling of two adjacent liquid crystal display panels is carried on the support, and a width of the bezel is greater than or equal to a width of the support. The support does not block the incoming light of the display area of the liquid crystal display panel, which can effectively solve the shadow problem of the tiled display.

DRAWINGS

In order to more clearly explain the technical solutions according to the embodiments of the present application, the following will briefly introduce the drawings that need to be used in the description of the embodiments. It is apparent that the drawings in the following description are only some embodiments of the present application. For those of skilled in the art can obtain other drawings based on these drawings without any creative work.

DETAILED DESCRIPTION OF EMBODIMENTS

The technical solutions in the embodiments of the present application will be clearly and completely described below in conjunction with the drawings in the embodiments of the present application. It is apparent that the described embodiments are only a part of the embodiments of the present application, rather than all the embodiments. On the basis of the embodiments of the present application, all other embodiments obtained by those skilled in the art without any creative work belong to the protection scope of the present application. In addition, it should be understood that the specific embodiments described herein are only used to illustrate and explain the application and are not used to limit the application. In the present application, in the absence of a contrary explanation, the location terms used herein, such as "above" and "below", usually refer to top and bottom of the device in actual use or working condition, specifically the direction of the accompanying drawings; while "inside" and "outside" are for an outline of the device.

The embodiments of the application provide a tiled display. The following contents are detailed descriptions. It should be noted that the order of description of the following embodiments is not a limitation on the preferred order of the embodiments.

Figure 1:
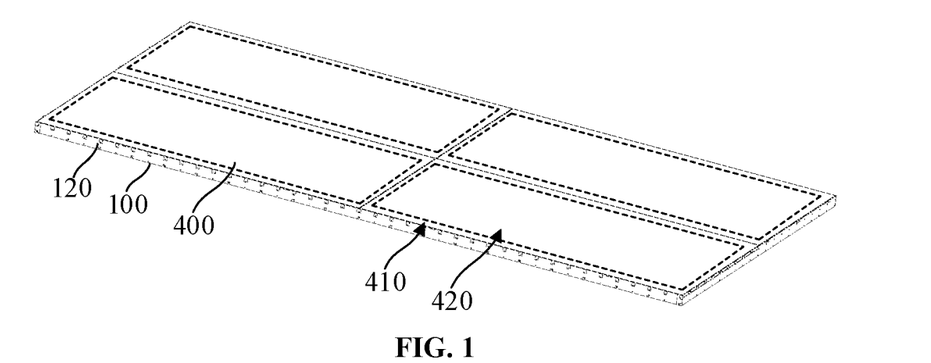
FIG. 1 is a schematic stereoscopic structural view of a tiled display provided by an embodiment of the present application.
Figure 2:
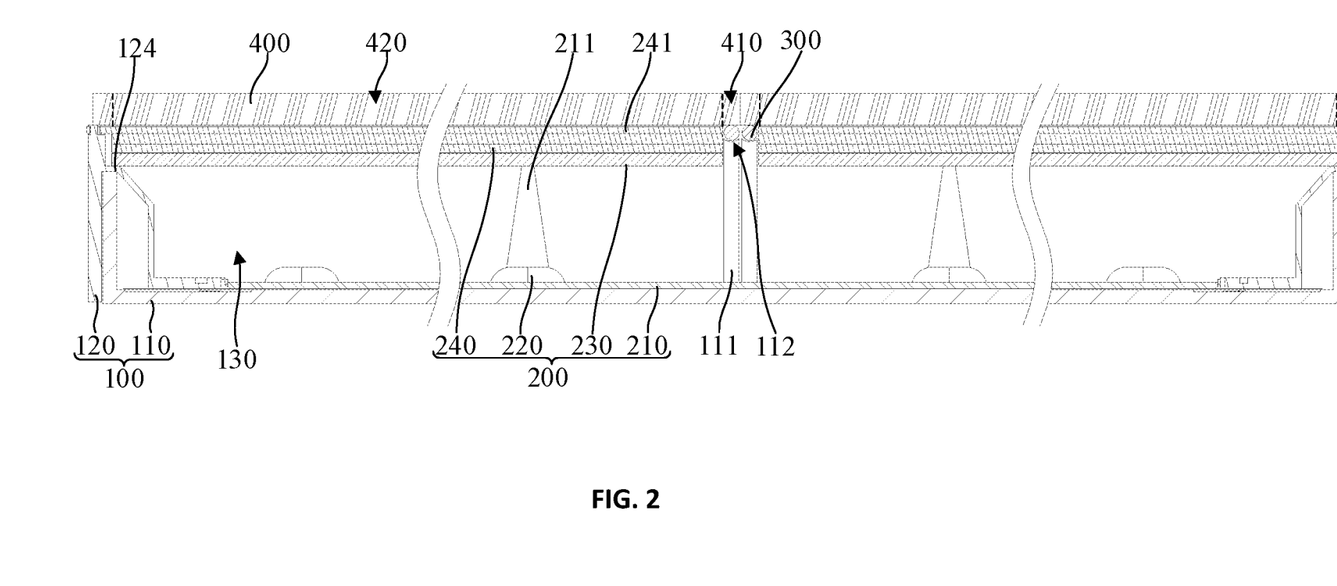
FIG. 2 is a schematic cross-sectional structural view of the tiled display provided by an embodiment of the present application.
Figure 3:
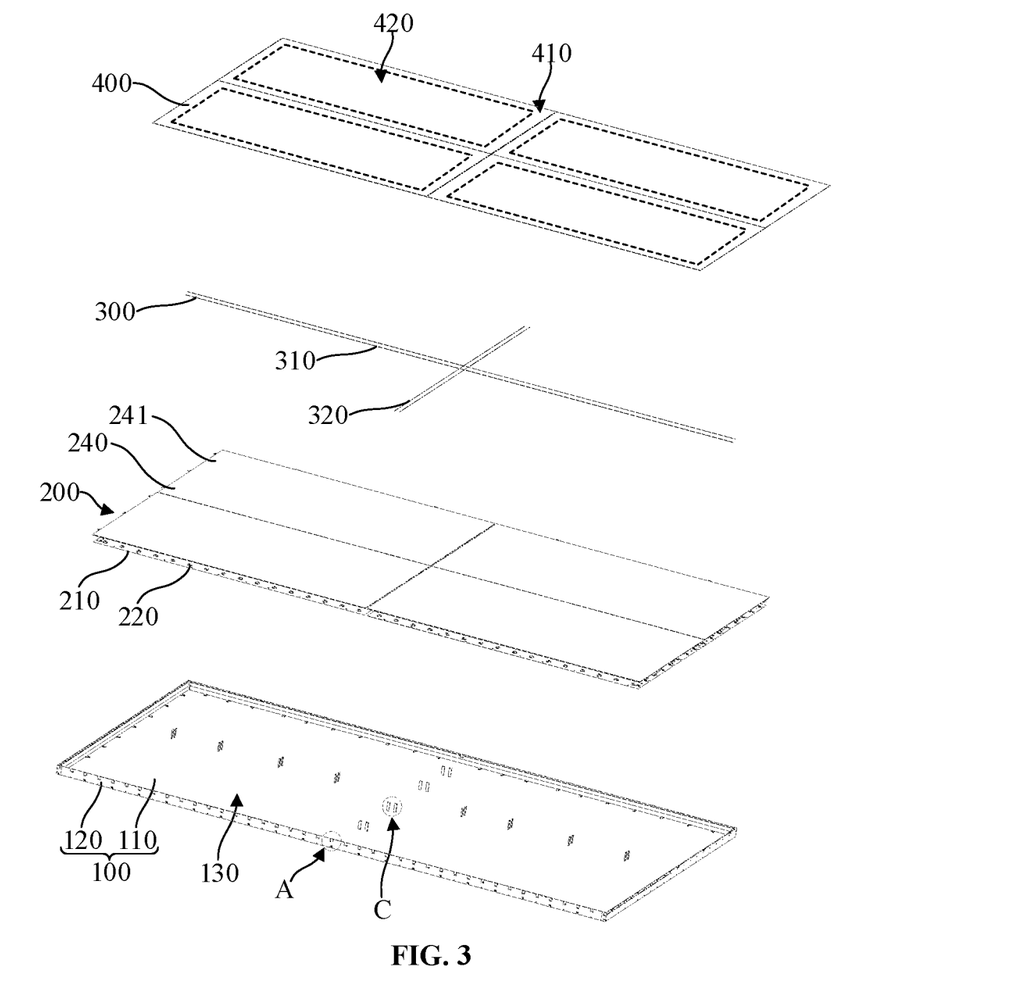
FIG. 3 is a schematic exploded structural view of the tiled display provided by an embodiment of the present application.

Referring to FIGS. 1 to 3, the embodiments of the application provide a tiled display, including: a housing 100, a backlight unit 200, at least two supports 300, and at least two liquid crystal display panels 400. The backlight unit 200 is arranged on a side of the housing 100. The backlight unit 200 is used for emitting light toward the liquid crystal display panel 400. The supports 300 are provided in the housing 100 and located on the light output side of the backlight unit 200, and the supports 300 are used to support the liquid crystal display panel 400. The liquid crystal display panel 400 is fixed on the housing 100. Namely, the liquid crystal display panel 400 is at least partially carried on the housing 100, The liquid crystal display panel 400 is located on a side of the support 300 away from the backlight unit 200, so that the liquid crystal display panel 400 can receive the light from the backlight unit 200, so as to display the image.

In the tiled display according to the embodiments of the present application, the liquid crystal display panel 400 has a bezel 410 and a display area 420, and the bezel 410 is configured around the display area 420. The bezel 410 at the tiling of two adjacent liquid crystal display panels 400 is arranged on the support 300, and a width of the bezel 410 is greater than or equal to a width of the support 300. The support 300 does not block the incoming light of the liquid crystal display panel 400, which can effectively solve the shadow problem of the tiled display.

It should be noted that the width mentioned above refers to a distance on two opposite sides of a corresponding structure along an extension direction perpendicular to the seam.

In the tiled display according to the embodiments of the present application, between the two adjacent liquid crystal display panels 400, the bezel 410 at the tiling of one liquid crystal display panel 400 is carried on a support 300, and the bezel 410 at the tiling of another liquid crystal display panel 400 is loaded on another support 300. Certainly, according to the selection of the actual situations and specific requirements, between the two adjacent liquid crystal display panels 400, the bezel 410 at the tiling of one liquid crystal display panel 400 may be carried on at least two supports 300, and the bezel 410 at the tiling of another liquid crystal display panel 400 can be carried on at least two supports 300.

In particular, in the tiled display according to the embodiments of the present application, a portion of the bezel 410 of the liquid crystal display panel 400 is fixed on the housing 100, and the bezel 410 at the tiling of the two adjacent liquid crystal display panels 400 is carried on the supports 300, which can prevent from blocking of the incoming light of the display area 420 and avoid the occurrence of shadow problems. In addition, the portion of the bezel 410 of the liquid crystal display panel 400 is carried on the support 300, and the liquid crystal display panel 400 is supported by the housing 100 and the support 300, so that the spacing between the liquid crystal display panel 400 and the backlight unit 200 can be stably maintained to prevent the liquid crystal display panel 400 from crushing the backlight unit 200 and causing malfunction of the display.

Specifically, as shown in FIGS. 2 and 3, the housing 100 includes a back plate 110 and a frame 120. The frame 120 is coupled to a peripheral side of the back plate 110. Namely, the frame 120 is arranged around the back plate 110, so that the back plate 110 and the frame 120 together enclose to form an accommodating cavity 130, and the backlight unit 200 is at least partially arranged in the accommodating cavity 130. In this structure, by configuring the backlight unit 200 at least partially arranged in the accommodating cavity 130, a volume of the tiled display may be reduced, so as to achieve the lightweight design of the tiled display. In this embodiment, the supports 300 may be fixed to the frame 120, and the liquid crystal display panel 400 may be fixed to the frame 120.

It can be understood that in the embodiments of the present application, although the backlight unit 200 is completely arranged in the accommodating cavity 130. According to the selection of the actual situations and the specific requirements, the backlight unit 200 may also be partially accommodated in the accommodating cavity 130 and the other portion is located outside the housing 100. It can also achieve the technical effect of lightweight, which is not limited here.

Figure 4:
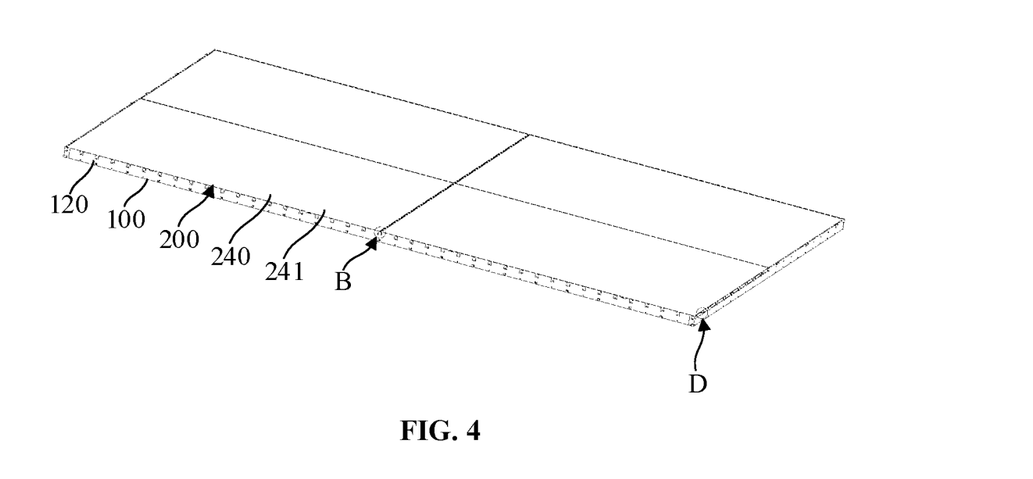
FIG. 4 is a schematic stereoscopic structural view of a tiled display provided by an embodiment of the present application after omitting the liquid crystal display panel.

Specifically, as shown in FIGS. 2 to 4, two ends of the support 300 are fixed to the frame 120, and the middle of the support 300 is suspended on the light output side of the backlight unit 200. A conventional technical solution is to configure an uninterrupted frame at the tiling of two adjacent liquid crystal display panels, and part of the light emitted by the backlight unit shines toward the frame at the tiling and is absorbed by the frame at the tiling, which undoubtedly reduces the utilization of light. The suspending portion of the support 300 according to the embodiments of the present application does not block the light emitted by the backlight unit 200, which can improve the utilization of light, so as to increase the display brightness at the tiling, and solve the shadow problem at the tiling.

Figure 5:
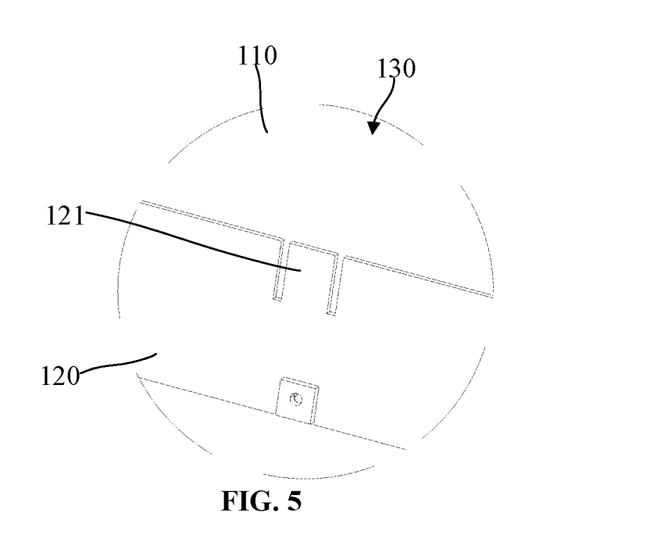
FIG. 5 is the schematic view of an enlarged structure of area A in FIG. 3.

Specifically, as shown in FIGS. 3 and 5, the frame 120 is provided with fixture ribs 121 corresponding two ends of the support 300. In combination with FIGS. 2, 4, and 6, the two ends of the support 300 are fixed to the corresponding fixing ribs 121. In this structure, by fixing both ends of the support 300 to the corresponding fixture ribs 121, thereby suspending the middle of the support 300, the suspending portion of the support 300 does not block the light emitted by the backlight unit 200, which can improve the utilization of light, so as to increase the display brightness at the tiling, and solve the shadow problem at the tiling.

Figure 6:
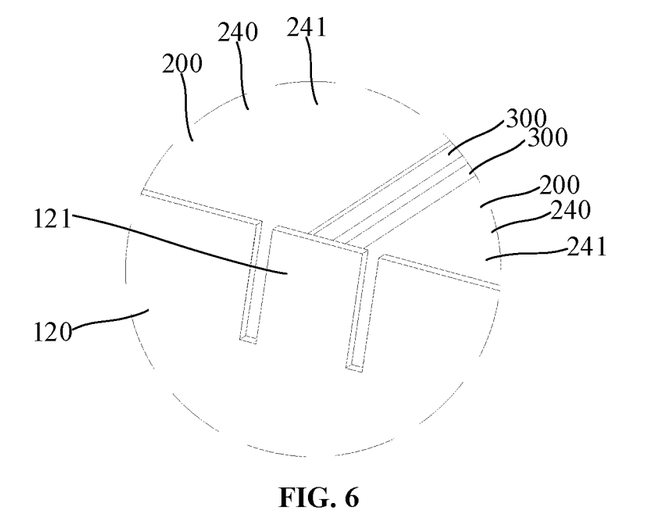
FIG. 6 is the schematic view of an enlarged structure of area B in FIG. 4.

In the tiled display according to the embodiments of the application, the support 300 may be fixed to the fixture rib 121 by binding. Certainly, according to the selection of the actual situations and specific requirements, it may also be fixed to the fixture rib 121 by other means such as gluing, hook, etc., which does not limit here.

Specifically, in the tiled display according to the embodiments of the present application, material of the support 300 is selected from one or more of steel wire, nylon wire, carbon plastic wire, ceramic wire and polyethylene wire, the wires have a stronger tensile strength and longer service life, so as to avoid sagging and deformation caused by ageing of the support 300, thereby stably maintaining the spacing between the liquid crystal display panel 400 and the backlight unit 200. It can be understood that, according to the selection of the actual situations and specific requirements, the support 300 can also be a wire made of other materials, which does not limit here.

In one embodiment of the present application, the support 300 includes a first support 310 and a second support 320 intersecting with the first support 310, and the first support 310 and the second support 320 are an integrated structure. In this structure, it can be ensured that surfaces of the first support 310 and the second support 320 can be evenly in contact with the liquid crystal display panel 400 so that surfaces of two adjacent liquid crystal display panels 400 are flush.

In another embodiment of the present application, the support includes a first support 310 and a second support 320 intersecting with the first support 310. The first support 310 and the second support 320 may not be an integrated structure. Namely, the first support 310 and the second support 320 may be two separately formed structures, and the first support 310 and the second support 320 are stacked at the intersection. In this structure, since the first support 310 and the second support 320 are two independent structures, it is convenient to adjust the tension of the first support 310 or the second support 320 separately and reduce the interaction between the first support 310 and the second support 320.

Specifically, in the tiled display according to the embodiments of the present application, the first support 310 and the second support 320 intersect perpendicularly with each other. Certainly, according to the selection of the actual situations and specific requirements, the angle between the first support 310 and the second support 320 may be adjusted appropriately and is not limited here.

Figure 7:
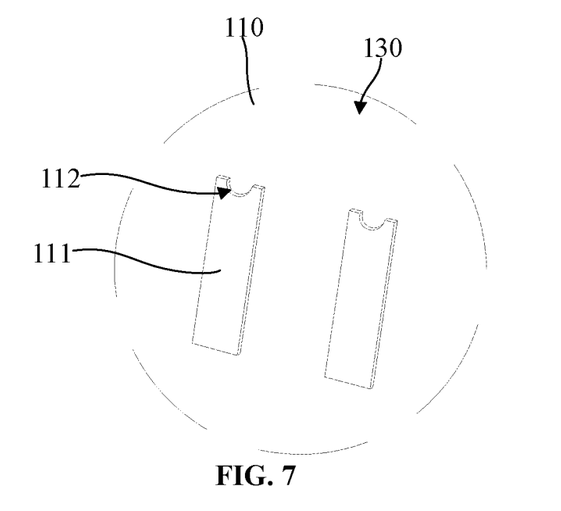
FIG. 7 is the schematic view of an enlarged structure of area C in FIG. 3.

Specifically, as shown in FIGS. 2, 3, and 7, a suspending portion of the back plate 110 corresponding to the support 300 is provided with a reinforcement rib 111, and a part of the support 300 is arranged on the reinforcement rib 111. In this structure, the reinforcement ribs 111 can play a supporting role, and prevent the support 300 from sagging and deformation, thereby stably maintaining the spacing between the liquid crystal display panel 400 and the backlight unit 200.

Furthermore, the reinforcement rib 111 is provided with a limitation groove 112 corresponding to the support 300, and the support 300 is clamped in the limitation groove 112. In this structure, the limitation groove 112 can limit a position of the support 300 and prevent the support 300 from shifting. In this embodiment, the reinforcement ribs 111 are provided corresponding to the bezel 410 of the liquid crystal display panel 400, so that the support 300 can be limited at the bezel 410.

Specifically, the suspending portion of each support 300 is supported on one or a plurality of reinforcement ribs 111 spaced apart from each other, so that it can prevent the suspending portion of the support 300 from sagging and deformation.

Specifically, material of the reinforcement rib 111 is a light transmitting material. In this structure, the reinforcement rib 111 does not block the light and can improve the utilization of the light. In this embodiment, the light transmitting material may be selected from one of or a combination of polymethylmethacrylate, polyimide, epoxy resin, polyethylene terephthalate, polycarbonate, polyvinyl chloride, polystyrene, and polypropylene.

Specifically, in the tiled display according to the embodiments of the present application, each reinforcement rib 111 is provided with a limitation groove 112, and according to the selection of the actual situations and the specific requirements, each reinforcement rib 111 may also be provided with at least two limitation grooves 112, which is not limited here.

Specifically, in the tiled display according to the embodiments of the present application, each limitation groove 112 is provided with a support 300, and according to the selection of the actual situations and the specific requirements, each limitation groove 112 may also be provided with at least two supports 300, which is not limited here. In the tiled display according to the embodiments of the application, when one support is provided in each limitation groove 112, each support 300 can be spaced apart to prevent tangling and knotting between the supports 300. When at least two supports 300 are provided in each limitation groove 112, the structure of the reinforcement rib 111 is simple, which effectively simplifies the assembling steps of the tiled display.

Specifically, in the tiled display according to the embodiments of the present application, the support 300 is bonded to the liquid crystal display panel 400 by glue. For example, the support 300 may be bonded to the bezel 410 at the tiling of the liquid crystal display panel 400 with an ultraviolet curing adhesive, the liquid crystal display panel 400 can be prevented from shifting, so that the supports 300 can stably support the liquid crystal display panel 400.

Specifically, in the tiled display according to the embodiments of the present application, the liquid crystal display panel 400 is bonded to the frame 120 by a glue. For example, a portion of the bezel 410 of the liquid crystal display panel 400 may be bonded to the frame 120 with, but not limited to, an ultraviolet curing adhesive, which is simple to operate, easy to implement, and the liquid crystal display panel 400 can be fixed stably on the frame 120.

Specifically, as shown in FIG. 3, the liquid crystal display panel 400 corresponds to the backlight unit 200 one by one. In this embodiment, the tiled display includes four liquid crystal display panels 400 and four backlight units 200. Certainly, according to the selection of the actual situations and specific requirements, one backlight unit 200 may correspond to at least two liquid crystal display panels 400, which is not limited here.

Figure 8:
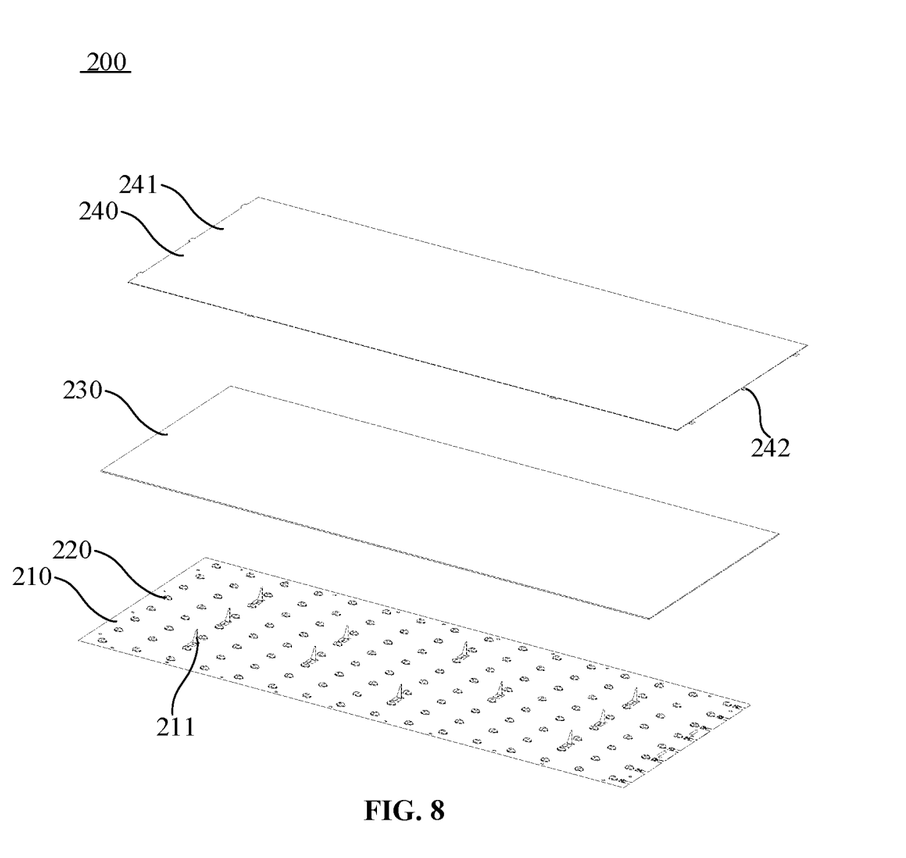
FIG. 8 is a schematic exploded structural view of the backlight unit provided by an embodiment of the present application.

Specifically, as shown in FIG. 8, the backlight unit 200 includes a circuit board 210, a plurality of light sources 220 arranged on the circuit board 210, a light guide plate 230 arranged on a light output side of the light sources 220, and an optical film group 240 arranged on a light output side of the light guide plate 230. The light sources 220 may be, but are not limited to, a light-emitting diode (LED) chip. In this structure, the light emitted by the light sources 220 is injected through the light guide plate 230 and the optical film group 240, which can achieve uniform light output.

Specifically, as shown in FIG. 2, the circuit board 210 is arranged in the accommodating cavity 130 and specifically fixed on a surface of the back plate 110. The circuit board 210 can be protected by accommodating the circuit board 210 in the accommodating cavity 130, and it also facilitates the lightweight design of the tiled display. In this embodiment, the circuit board 210 can be fixed on the surface of the back plate 110 by screw, glue or other means, with simple structure and easy operation.

Specifically, as shown in FIGS. 2 and 8, the light guide plate 230 is arranged in the accommodating cavity 130, which can protect the light guide plate 230 and facilitate to the lightweight design of the tiled display. Specifically, the frame 120 is provided with a step 124, some edges of the light guide plate 230 are abutted on the step 124, and the optical film group 240 is stacked on the light guide plate 230. In this structure, the spacing between the light guide plate 230 and the light sources 220 can be stably maintained to prevent the light guide plate 230 from crushing the light source 220. In this embodiment, part of the light sources 220 of the light guide plate 230 may be fixed to the step 124 by glue, but is not limited to.

Specifically, as shown in FIGS. 2 and 8, the circuit board 210 is provided with a spacer 211, and one end of the spacer 211 away from the circuit board 210 is abutted on the light guide plate 230, thereby maintaining a stable distance between the light guide plate 230 and the light sources 220.

Specifically, in order to improve the light output brightness of the backlight unit 200, the spacer 211 is made of a light transmitting material, which may be selected from one of or a combination of polymethylmethacrylate, polyimide, epoxy resin, polyethylene terephthalate, polycarbonate, polyvinyl chloride, polystyrene and polypropylene.

Figure 9:
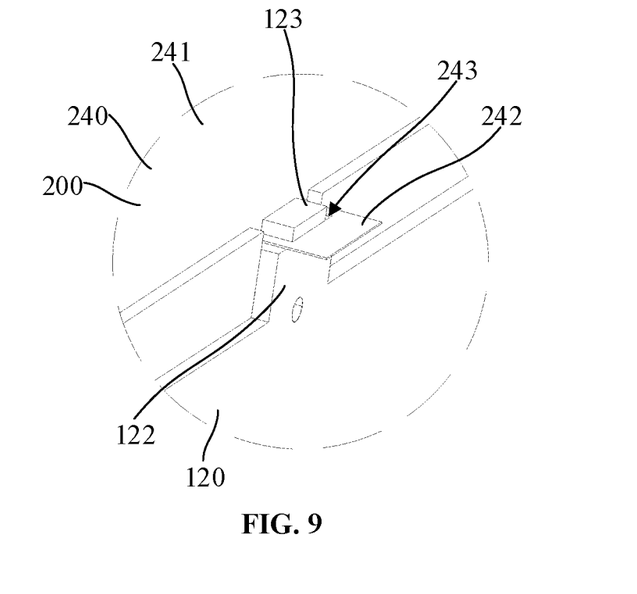
FIG. 9 is the schematic view of an enlarged structure of area D in FIG. 4.

Specifically, as shown in FIGS. 2, 4 and 9, the optical film group 240 includes multilayer laminated optical films 241, an uppermost layer of the multilayer laminated optical films 241 is provided with a plurality of positioning portions. The frame 120 is provided with a plurality of matching portions 122 corresponding to the positioning portions 242, and the positioning portions 242 are inserted with the matching portions 122, so that the optical films 241 are not easy to shift, and the optical films 241 are stably fixed to the frame 120.

Specifically, as shown in FIG. 9, the positioning portion 242 is provided with a slot 243, the matching portion 122 is provided with a connecting column 123, and the connecting column 123 is inserted into the slot 243, so that the optical films 241 are not easy to shift, and the optical films 241 are stably fixed to the frame 120. Certainly, according to the selection of the actual situations and specific requirements, the positioning portion 242 may be provided with a connecting column, the matching portion 122 is provided with a slot, and the connecting column is inserted into the slot, which can also make the positioning portion 242 insert into the matching portion 122, which is not limited here.

The above description describes a tiled display provided by the embodiments of the present application in detail. In this context, specific examples are used to explain the principle and implementation means of the present application. The description of the above embodiments is only used to help understand the methods and core ideas of the present application. Moreover, for those skilled in the art, they may change in the specific implementation means and application scope according to the ideas of the present application. In summary, the content of this specification should not be construed as a limitation to the present application.

What is claimed is:

1. A tiled display, comprising:
a housing;
a backlight unit arranged on a side of the housing;
at least two supports provided in the housing and located on a light output side of the backlight unit; and
at least two tiling liquid crystal display panels fixed on the housing and located on a side of the support away from the backlight unit, wherein the liquid crystal display panel has a bezel, the bezel at the tiling of two adjacent liquid crystal display panels is arranged on the support, and a width of the bezel is greater than or equal to a width of the support;
wherein the housing comprises a back plate and a frame coupled to a peripheral side of the back plate, the back plate and the frame surround to form an accommodating cavity, wherein the backlight unit is at least partially arranged in the accommodating cavity, the support is fixed to the frame, and the liquid crystal display panel is fixed to the frame.

2. The tiled display according to claim 1, wherein two ends of the support are fixed to the frame, and the middle of the support is suspended on the light output side of the backlight unit.

3. The tiled display according to claim 2, wherein the frame is provided with fixture ribs corresponding to two ends of the support, and the two ends of the support are fixed to the corresponding fixture ribs.

4. The tiled display according to claim 2, wherein material of the support is selected from one or more of steel wire, nylon wire, carbon plastic wire, ceramic wire and polyethylene wire.

5. The tiled display according to claim 2, wherein the support comprises a first support and a second support intersecting with the first support, and the first support and the second support are an integrated structure.

6. The tiled display according to claim 2, wherein the support comprises a first support and a second support intersecting with the first support, and the first support and the second support are stacked at the intersection.

7. The tiled display according to claim 2, wherein a suspending portion of the back plate corresponding to the support is provided with a reinforcement rib, and a part of the support is arranged on the reinforcement rib.

8. The tiled display according to claim 7, wherein material of the reinforcement rib is a light transmitting material.

9. The tiled display according to claim 8, wherein the reinforcement rib is provided with a limitation groove corresponding to the support, and the support is clamped in the limitation groove.

10. The tiled display according to claim 9, wherein one or more than one of the support is clamped in the limitation groove.

11. The tiled display according to claim 2, wherein the support is bonded to the liquid crystal display panel by a glue.

12. The tiled display according to claim 1, wherein the liquid crystal display panel is bonded to the frame by a glue.

13. The tiled display according to claim 1, wherein the backlight unit further comprises a circuit board, a plurality of light sources arranged on the circuit board, a light guide plate arranged on a light output side of the light sources, and an optical film group arranged on a light output side of the light guide plate.

14. The tiled display according to claim 13, wherein the circuit board is arranged in the accommodating cavity and fixed on a surface of the back plate.

15. The tiled display according to claim 13, wherein the frame is provided with a step, the light guide plate is abutted on the step, and the optical film group is stacked on the light guide plate.

16. The tiled display according to claim 13, wherein the circuit board is provided with a spacer, and one end of the spacer away from the circuit board is abutted on the light guide plate.

17. The tiled display according to claim 13, wherein the optical film group comprises multilayer laminated optical films, an uppermost layer of the multilayer laminated optical film is provided with a plurality of positioning portions, the frame is provided with a plurality of matching portions corresponding to the positioning portions, and the positioning portions are inserted with the matching portions.

18. The tiled display according to claim 17, wherein the positioning portion is provided with a slot, the matching portion is provided with a connecting column, and the connecting column is inserted into the slot.

19. The tiled display according to claim 17, wherein the positioning portion is provided with a connecting column, the matching portion is provided with a slot, and the connecting column is inserted into the slot.

\* \* \* \* \*